(12) United States Patent
Kim et al.

(10) Patent No.: US 10,795,087 B2
(45) Date of Patent: Oct. 6, 2020

(54) ULTRA-SMALL MULTI-CHANNEL OPTICAL MODULE WITH OPTICAL WAVELENGTH DISTRIBUTION

(71) Applicant: ELECTRONICS AND TELECOMMUNICATIONS RESEARCH INSTITUTE, Daejeon (KR)

(72) Inventors: Dae Seon Kim, Gwangju (KR); Jong Jin Lee, Gwangju (KR); Eun Kyu Kang, Gwangju (KR); Sang Jin Kwon, Gwangju (KR); Jeong Eun Kim, Gwangju (KR); Kwon Seob Lim, Daejeon (KR); Eun Kyoung Jeon, Gwangju (KR); Soo Yong Jung, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/687,353

(22) Filed: Nov. 18, 2019

(65) Prior Publication Data
US 2020/0158958 A1 May 21, 2020

(30) Foreign Application Priority Data

Nov. 19, 2018 (KR) .................... 10-2018-0142231
Mar. 5, 2019 (KR) .................... 10-2019-0025374

(51) Int. Cl.
*H04B 10/40* (2013.01)
*H04J 14/02* (2006.01)
*G02B 6/293* (2006.01)
*G02B 6/42* (2006.01)
*H04B 10/50* (2013.01)

(52) U.S. Cl.
CPC ....... *G02B 6/29367* (2013.01); *G02B 6/2938* (2013.01); *G02B 6/29365* (2013.01); *G02B 6/4215* (2013.01); *H04B 10/40* (2013.01); *H04B 10/506* (2013.01); *H04J 14/02* (2013.01)

(58) Field of Classification Search
CPC ........ H04B 10/40; H04B 10/43; H04B 10/50; H04B 10/506; H04J 14/0215
USPC .......................... 398/79, 135–139, 140, 201
See application file for complete search history.

(56) References Cited

U.S. PATENT DOCUMENTS

| | | | | |
|---|---|---|---|---|
| 8,488,244 B1* | 7/2013 | Li | ......... | G02B 6/4215 359/618 |
| 9,401,773 B1* | 7/2016 | Gui | ......... | G02B 6/428 |
| 9,551,833 B1* | 1/2017 | Li | ......... | G02B 6/29365 |
| 2002/0131180 A1* | 9/2002 | Goodman | ......... | G02B 6/29367 359/634 |
| 2004/0101247 A1* | 5/2004 | Chen | ......... | G02B 6/32 385/47 |

(Continued)

FOREIGN PATENT DOCUMENTS

KR 1020110125426 A 11/2011

*Primary Examiner* — Li Liu

(57) ABSTRACT

An ultra-small multi-channel optical module according to one embodiment of the present invention includes a base board, a glass substrate, a heat sink, optical elements, parallel light lenses, a first rectangular reflector, a glass cover, a second rectangular reflector, horizontal reflectors, and a light collecting lens.

20 Claims, 5 Drawing Sheets

(56) References Cited

U.S. PATENT DOCUMENTS

| | | | | |
|---|---|---|---|---|
| 2004/0234210 A1* | 11/2004 | Nagasaka | ............ | G02B 6/4214 |
| | | | | 385/88 |
| 2006/0280421 A1* | 12/2006 | Tanaka | .................. | G02B 26/02 |
| | | | | 385/140 |
| 2010/0002987 A1* | 1/2010 | Hata | .................... | G02B 6/4204 |
| | | | | 385/14 |
| 2010/0329678 A1* | 12/2010 | Wang | ................ | G02B 6/29367 |
| | | | | 398/79 |
| 2011/0058771 A1* | 3/2011 | Lee | ..................... | G02B 6/4215 |
| | | | | 385/33 |
| 2012/0213527 A1* | 8/2012 | Duijn | .................. | G02B 6/4246 |
| | | | | 398/139 |
| 2013/0148969 A1* | 6/2013 | Sheu | ...................... | H04B 10/40 |
| | | | | 398/79 |
| 2013/0148970 A1* | 6/2013 | Nakajima | ............... | H04J 14/02 |
| | | | | 398/79 |
| 2014/0346323 A1* | 11/2014 | Fujimura | ............. | G02B 6/4215 |
| | | | | 250/208.2 |
| 2015/0365176 A1* | 12/2015 | Kawamura | .......... | H04B 10/676 |
| | | | | 29/825 |
| 2016/0170145 A1* | 6/2016 | Kawamura | .......... | G02B 6/2938 |
| | | | | 250/226 |
| 2017/0123158 A1 | 5/2017 | Heo et al. | | |
| 2017/0125972 A1 | 5/2017 | Kim et al. | | |
| 2017/0131474 A1* | 5/2017 | Dannenberg | ......... | G02B 6/2938 |
| 2017/0131492 A1* | 5/2017 | Vallance | .............. | G02B 6/4251 |
| 2018/0120507 A1* | 5/2018 | Kang | ................... | G02B 6/4215 |
| 2018/0128983 A1* | 5/2018 | Huang | .............. | G02B 6/29365 |
| 2019/0052362 A1* | 2/2019 | Peterson | ............ | G02B 27/0961 |
| 2019/0052391 A1* | 2/2019 | Peterson | ............. | H04J 14/0278 |
| 2019/0103936 A1* | 4/2019 | Kawamura | .......... | G02B 6/4215 |

* cited by examiner

ULTRA-SMALL MULTI-CHANNEL OPTICAL MODULE WITH OPTICAL WAVELENGTH DISTRIBUTION

CROSS-REFERENCE TO RELATED APPLICATION

This application claims priority to and the benefit of Korean Patent Application Nos. 10-2018-0142231 and 10-2019-0025374, filed on Nov. 19, 2018 and Mar. 5, 2019, the disclosure of which are incorporated herein by reference in its entirety.

BACKGROUND

1. Field of the Invention

The present invention relates to a wavelength division multiplexing (WDM) multi-channel optical communication module, and more particularly, to an ultra-small multi-channel optical module with optical wavelength distribution using an optical filter.

2. Discussion of Related Art

In a case of a wavelength division multiplexing (WDM) optical communication module, since a plurality of light beams having different wavelengths are used, elements or a method is required to distribute optical wavelengths in channels. Generally, the optical wavelengths are distributed using an arrayed waveguide grating (AWG) or optical filters.

In a case in which the optical wavelengths are distributed using the optical filter, an optical property of the optical filter, which transmits or reflects a light beam having a specific wavelength, is used.

In a case of a multi-channel optical module using optical filters, elements or components are disposed while maintaining predetermined distances between channels. Multi-wavelength light beams collected on one path are distributed according to each wavelength by the optical filters to reach a receiver, or when multi-channel light beams are generated by a transmitter, a predetermined gap should be maintained between channels.

An interval between the channels in the receiver or transmitter relates to incident angles of light beams on the optical filter and moving distances of the light beams.

Korea Patent Publication No. 10-2011-0125426 (Published Date, Nov. 21, 2011) is a document related to the present invention, and a technology related to an optical module package structure for two-way communication is disclosed in the related document.

SUMMARY OF THE INVENTION

The present invention is directed to providing an ultra-small multi-channel optical module with optical wavelength distribution using an optical filter.

Technical objectives to be solved through the present invention are not limited to the above-described technical objective, and other objectives which are not described above may be clearly understood by those skilled in the art from the following descriptions.

According to an aspect of the present invention, there is provided an ultra-small multi-channel optical module with optical wavelength distribution including a plurality of optical elements configured to emit light having different wavelengths; parallel light lenses configured to convert the light emitted by the optical elements into parallel light; a first rectangular reflector configured to reflect the parallel light, which are converted by the parallel light lenses, in a vertical direction; a second rectangular reflector which is disposed above the first rectangular reflector with a gap therebetween, reflects the parallel light, which are reflected by the first rectangular reflector, in a horizontal direction, and reflects parallel light, which are collinearly received, in the vertical direction; horizontal reflectors disposed to be collinear with the second rectangular reflector with a gap therebetween and configured to reflect the parallel light, which are reflected by the second rectangular reflector, in the horizontal direction; optical filters which are disposed between the first rectangular reflector and the second rectangular reflector, transmit the parallel light which move from the first rectangular reflector toward the second rectangular reflector, and reflect the parallel light, which move from the second rectangular reflector toward the first rectangular reflector, back toward the second rectangular reflector; and a light collecting lens configured to receive a plurality of light beams, which are emitted by the optical elements, from the horizontal reflector.

The first rectangular reflector may have a form inclined upward at an angle of 45°.

The second rectangular reflector may have a form inclined downward at an angle of 45° so that the parallel light received from thereunder is reflected in the horizontal direction and the parallel light collinearly received is reflected downward in the vertical direction.

The horizontal reflectors may be disposed to face the plurality of optical elements, and the number of the horizontal reflectors may be the same as that of the optical elements.

The horizontal reflectors may be fixed to face the plurality of optical elements and to be coplanar therewith.

The parallel light lenses may be disposed between the optical elements and the first rectangular reflector to be collinear therewith and to have a predetermined gap therebetween, and the number of the parallel light lenses may be the same as that of the optical elements.

Here, the ultra-small multi-channel optical module with optical wavelength distribution may further include a base board having a hollow form having a mounting hole passing through the base board, a glass substrate disposed on the base board; a heat sink seated inside the mounting hole of the base board and disposed under the optical elements, the parallel light lenses, and the first rectangular reflector, and a glass cover having a form which covers the glass substrate and on which the second rectangular reflector, the horizontal reflectors, and the light collecting lens are disposed.

The base board may include an optical element driver connected to the optical elements.

The base board may include an optical element driver connected to the optical elements, and the optical elements and the optical element driver may be connected through lead wires.

The glass substrate may include a through glass via (TGV) therein for electrical connection with an external device.

Wire-bonded lead wires may be provided in the TGV, and the lead wires may be electrically connected to the optical elements.

A contact surface of the glass cover in contact with the glass substrate may be sealed by solder.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving the same will be clearly understood with reference to the following embodiments and the accompanying drawings. However, the present invention is not limited to the embodiments to be disclosed below and may be implemented in various different forms. The embodiments are provided in order to fully explain the present invention and fully explain the scope of the present invention for those skilled in the art. The scope of the present invention is only defined by the appended claims. Unless the context clearly indicates otherwise, the singular forms include the plural forms. The term "comprise" or "comprising" used herein specifies some stated components, steps, operations and/or elements, but do not preclude the presence or addition of one or more other components, steps, operations and/or elements.

Hereinafter, embodiments of the present invention will be described with reference to accompanying drawings in detail.

Figure 1:
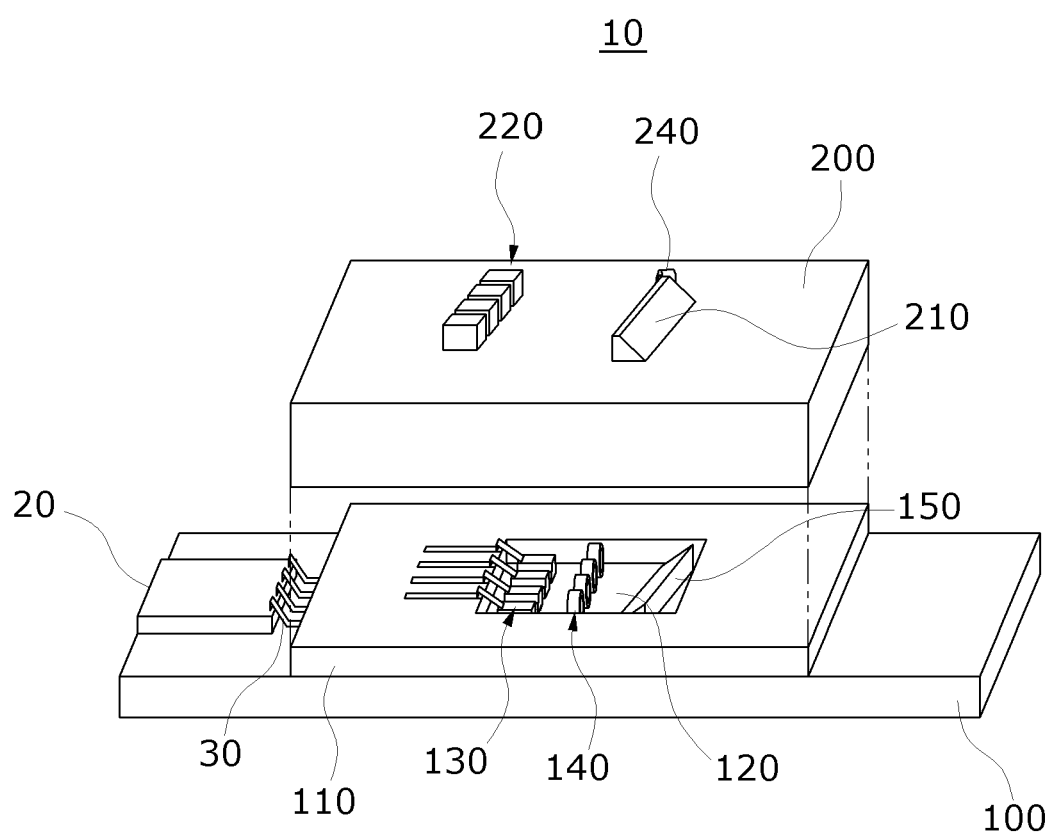
FIG. 1 is a view illustrating an ultra-small multi-channel optical module according to one embodiment of the present invention.

FIG. 1 is a view illustrating an ultra-small multi-channel optical module according to one embodiment of the present invention.

Referring to FIG. 1, an ultra-small multi-channel optical module 10 includes a base board 100, a glass substrate 110, a heat sink 120, optical elements 130, parallel light lenses 140, a first rectangular reflector 150, a glass cover 200, a second rectangular reflector 210, horizontal reflectors 220, and a light collecting lens 240.

The base board 100 has a hollow form having a mounting hole passing through the base board 100. The base board 100 forms a basic panel at a lower end portion of the ultra-small multi-channel optical module 10.

The base board 100 may include an optical element driver 20 connected to the optical elements 130. Here, lead wires 30 are wire-bonded and installed between the optical elements 130 and the optical element driver 20.

The glass substrate 110 is disposed on the base board 100. The glass substrate 110 includes a through glass via (TGV) therein for electrical connection with an external device. The lead wires 30 capable of being electrically connected to the external device are installed in the TGV.

The heat sink 120 is seated inside a mounting hole of the base board 100. The heat sink 120 serves to reduce heat therearound. Generally, since elements and components related to light generate a great deal of heat, the heat sink 120 is necessarily required to maintain the performance of the elements and components.

The optical elements 130 are disposed on the heat sink 120. The plurality of optical elements 130 are disposed on the heat sink 120 to emit light having different wavelengths.

The parallel light lenses 140 are disposed on the heat sink 120 to convert light emitted by the optical elements 130 into parallel light.

The first rectangular reflector 150 is disposed on the heat sink 120 to reflect the parallel light converted by the parallel light lenses 140 in a vertical direction.

The glass cover 200 covers the glass substrate 110 to form a sealed structure.

The second rectangular reflector 210 is disposed on the glass cover 200. Here, the second rectangular reflector 210 is disposed above the first rectangular reflector 150 with a gap therebetween.

The horizontal reflectors 220 are fixed on the glass cover 200. Since the horizontal reflectors 220 are fixed on a flat surface of the glass cover 200, a degree of freedom required for optical alignment can be reduced.

The light collecting lens 240 is disposed on the glass cover 200 and receives a plurality of light beams, which are emitted by the optical elements 130, from the horizontal reflector 220. Here, the light collecting lens 240 emits the received light to the outside.

Figure 2:
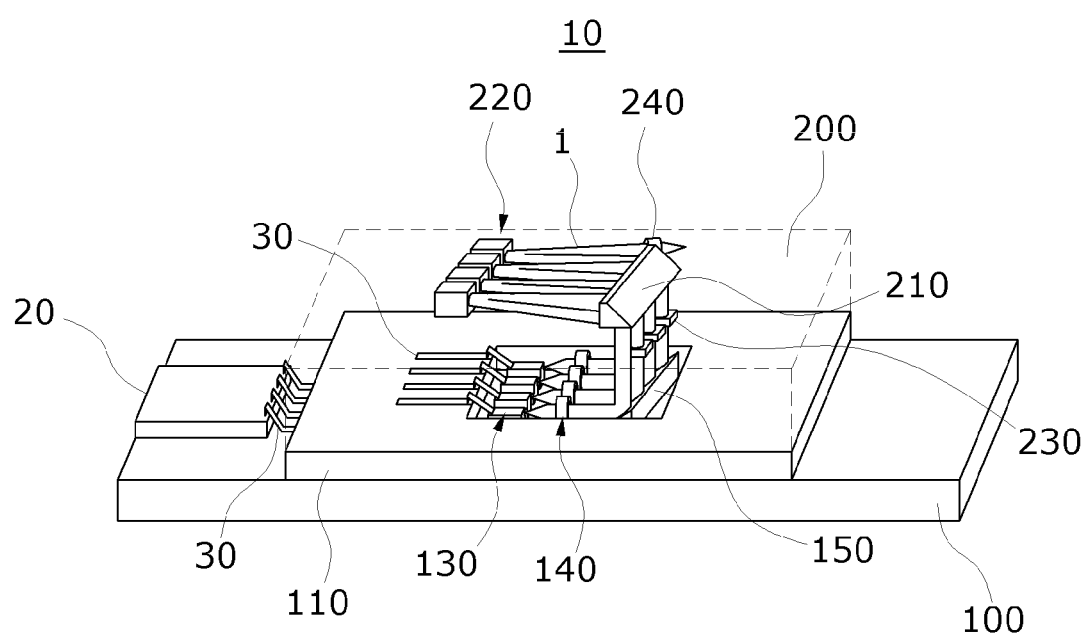
FIG. 2 is a view illustrating an operational relationship of the ultra-small multi-channel optical module according to one embodiment of the present invention.
Figure 3:
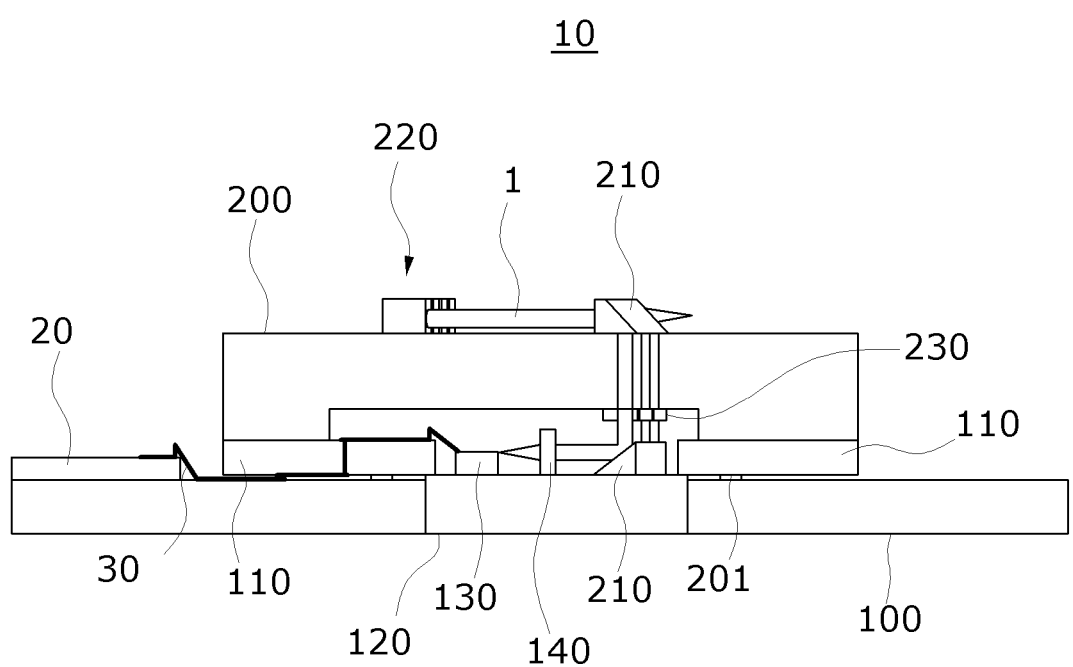
FIG. 3 is a cross-sectional view illustrating the ultra-small multi-channel optical module according to one embodiment of the present invention.

FIG. 2 is a view illustrating an operational relationship of the ultra-small multi-channel optical module according to one embodiment of the present invention, and FIG. 3 is a cross-sectional view illustrating the ultra-small multi-channel optical module according to one embodiment of the present invention;

Referring to FIGS. 2 and 3, since the ultra-small multi-channel optical module 10 may form a moving path of light 1 in a horizontal direction and a vertical direction due to a structural difference of an optical device, a space required for distributing optical wavelengths may be reduced. Accordingly, the optical module can be miniaturized.

Hereinafter, operational relationships between components of the ultra-small multi-channel optical module 10 according to the present invention will be described in detail.

The optical elements 130 emit light 1 having different wavelengths.

The parallel light lenses 140 convert the light emitted by the optical elements 130 into parallel light. The parallel light lenses 140 are disposed between the optical elements 130 and the first rectangular reflector 150 to be collinear therewith and to have predetermined gaps therebetween.

Here, the number of the parallel light lenses 140 may be the same as that of the optical elements 130.

The first rectangular reflector 150 reflects the parallel light, which are converted by the parallel light lenses 140, in the vertical direction. Here, the first rectangular reflector 150 has a form inclined upward at an angle of 45°.

The second rectangular reflector 210 is disposed above the first rectangular reflector 150 with a gap therebetween.

Here, the second rectangular reflector 210 reflects the parallel light, which are reflected by the first rectangular reflector 150, in the horizontal direction, and reflects the parallel light, which are collinearly received, in the vertical direction.

The second rectangular reflector 210 may have a form which is inclined downward at an angle of 45° so that the parallel light received from thereunder is reflected in the horizontal direction and the parallel light collinearly received is reflected downward in the vertical direction.

The horizontal reflectors 220 are disposed to be collinear with the second rectangular reflector 210 with gaps therebetween. The horizontal reflectors 220 reflect the parallel light, which are reflected by the second rectangular reflector 210, in the horizontal direction.

The horizontal reflectors 220 are disposed to face the plurality of optical elements 130, and the number of the horizontal reflectors 220 is the same as that of the optical elements 130. The horizontal reflectors 220 may be fixed to be coplanar therewith so as to face the plurality of optical elements 130.

Optical filters 230 are disposed between the first rectangular reflector 150 and the second rectangular reflector 210. The optical filters 230 transmit the parallel light moving from the first rectangular reflector 150 toward the second rectangular reflector 210.

In addition, the optical filters 230 reflect the parallel light, which move from the second rectangular reflector 210 toward the first rectangular reflector 150, back toward the second rectangular reflector 210.

The light collecting lens 240 receives a plurality of light beams, which are emitted by the optical elements 130, from the horizontal reflector 220. The light collecting lens 240 is a lens for collecting the light at one point, and the light collecting lens 240 not only serves to collect light but also improves a resolution of an image or refracts light according to an objective or usage.

Meanwhile, referring to the cross-sectional view of FIG. 3, the base board 100 has the hollow form having the mounting hole passing through the base board 100. The base board 100 includes the optical element driver 20 connected to the optical elements 130.

The optical elements 130 and the optical element driver 20 are connected through the wire-bonded lead wires 30.

The heat sink 120 is seated and fixed inside the mounting hole of the base board 100. The glass cover 200 has a form which covers and seals the glass substrate 110.

That is, a contact surface of the glass cover 200 in contact with the glass substrate 110 is sealed by solder 201.

The glass substrate 110 includes the TGVs therein for connection with an external device. The lead wires 30 are provided inside the TGVs (not shown). The lead wires 30 may be electrically connected to the optical elements 130.

Figure 4:
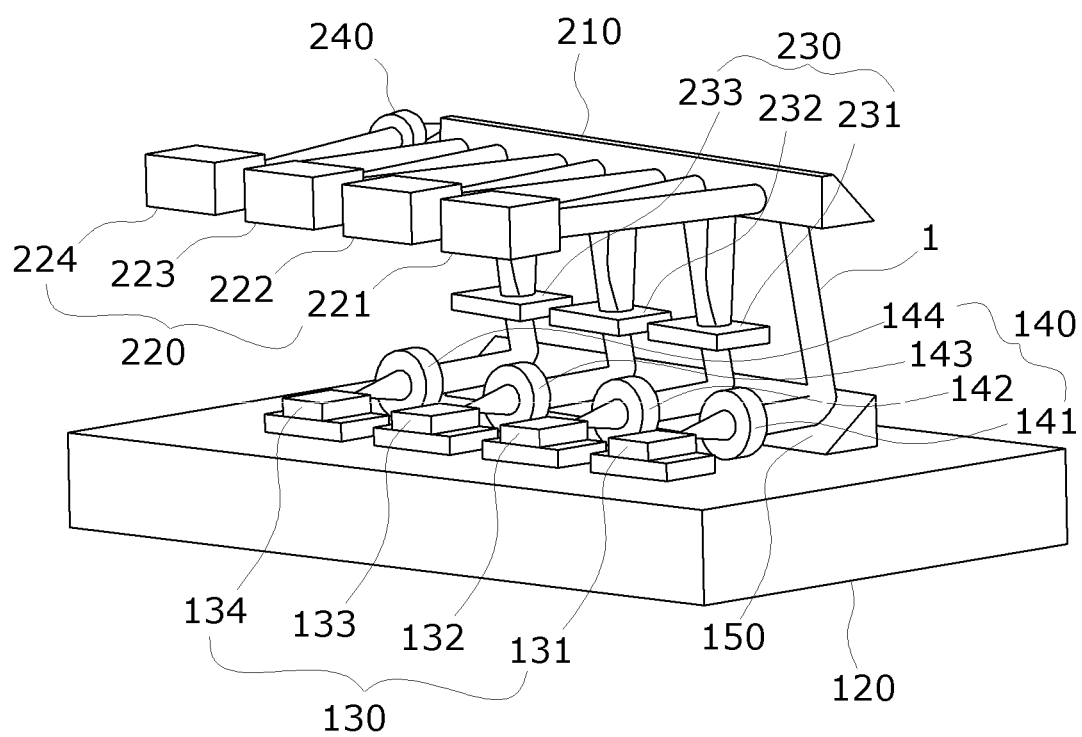
FIG. 4 is a view for describing a moving path of light in the ultra-small multi-channel optical module according to one embodiment of the present invention.
Figure 5:
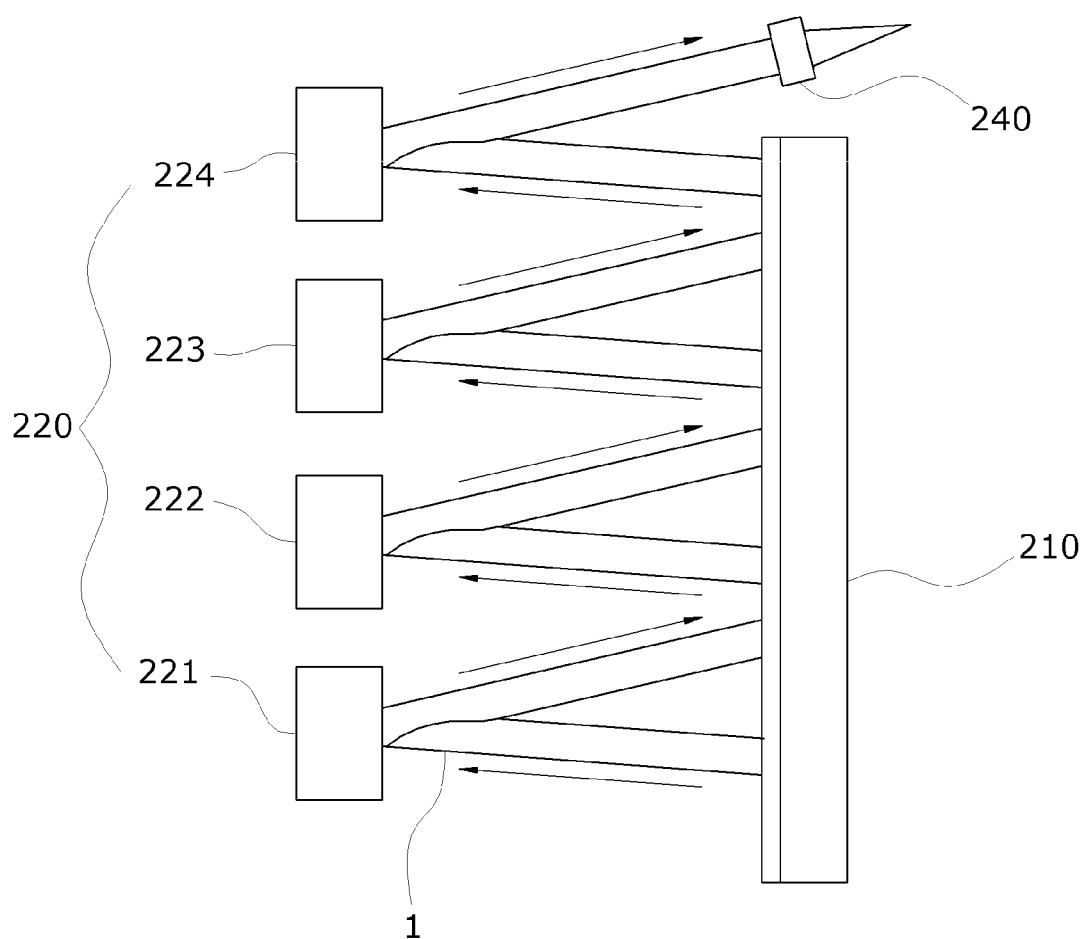
FIG. 5 is a schematic view for describing the moving path of the light in the ultra-small multi-channel optical module according to one embodiment of the present invention.

FIG. 4 is a view for describing a moving path of light in the ultra-small multi-channel optical module according to one embodiment of the present invention, and FIG. 5 is a schematic view for describing the moving path of the light in the ultra-small multi-channel optical module according to one embodiment of the present invention.

Referring to FIGS. 4 and 5, a path through which light moves is shown in detail.

First, the optical elements 130 emit light beams 1 having different wavelengths $\lambda 1$, $\lambda 2$, $\lambda 3$, and $\lambda 4$. Here, the optical elements 130 include a first optical element 131 for the wavelength $\lambda 1$, a second optical element 132 for the wavelength $\lambda 2$, a third optical element 133 for the wavelength $\lambda 3$, and a fourth optical element 134 for the wavelength $\lambda 4$.

When the first, second, third, and fourth optical elements 131, 132, 133, and 134 emit the light beams, the emitted light beams pass through the parallel light lenses 140. Here, the parallel light lenses 140 include a first parallel light lens 141, a second parallel light lens 142, a third parallel light lens 143, and a fourth parallel light lens 144.

The light beams emitted from the first, second, third, and fourth optical elements 131, 132, 133, and 134 respectively pass through the first, second, third, and fourth parallel light lenses 141, 142, 143, and 144. Here, the first, second, third, and fourth parallel light lenses 141, 142, 143, and 144 convert the received light beams into parallel light to emit the light to the first rectangular reflector 150.

The parallel light passing through the first parallel light lens 141 is reflected by the first rectangular reflector 150 in the vertical direction. The parallel light reflected as described above is reflected by the second rectangular reflector 210 in the horizontal direction. The light beam having the wavelength $\lambda 1$ reflected by the second rectangular reflector 210 is reflected by a first horizontal reflector 221 in the horizontal direction and moves back toward the second rectangular reflector 210.

Here, the light beam having the wavelength $\lambda 1$ moving toward the second rectangular reflector 210 is reflected downward in the vertical direction. Here, the optical filters 230 are disposed between the second rectangular reflector 210 and the first rectangular reflector 150.

The optical filters 230 include a first optical filter 231 formed at a position corresponding to the second optical element 132, a second optical filter 232 formed at a position corresponding to the third optical element 133, and a third optical filter 233 formed at a position corresponding to the fourth optical element 134.

The light beam having the wavelength $2\lambda 1$, which is reflected downward by the second rectangular reflector 210, meets the first optical filter 231 and is reflected upward back thereby. Here the reflected light beam having the wavelength $\lambda 1$ is reflected back by the second rectangular reflector 210 toward the second horizontal reflector 222.

Here, the light beam having the wavelength $\lambda 2$ emitted by the second optical element 132 passes through the first optical filter 231, meets the light beam having the wavelength $\lambda 1$, and moves through a path which is the same as that of the light beam having the wavelength $\lambda 1$.

Ultimately, the optical filters 230 are disposed between the first rectangular reflector 150 and the second rectangular reflector 210 to transmit the parallel light moving from the first rectangular reflector 150 toward the second rectangular reflector 210.

In addition, the optical filters 230 reflect the parallel light, which move from the second rectangular reflector 210 toward the first rectangular reflector 150, back toward the second rectangular reflector 210.

The above-described process is shown in Table 1 below, and the light beams having the wavelengths $\lambda 1$, $\lambda 2$, $\lambda 3$, and $\lambda 4$ reach the light collecting lens 240 through reflection and transmission.

TABLE 1

Optical Property of Optical Filter according to each Wavelength

| | Optical Filter 2 | Optical Filter 3 | Optical Filter 4 |
|---|---|---|---|
| $\lambda 1$ | Reflection | Reflection | Reflection |
| $\lambda 2$ | Transmission | Reflection | Reflection |
| $\lambda 3$ | | Transmission | Reflection |
| $\lambda 4$ | | | Transmission |

As described above, in the present invention, since a moving path of light extends in a horizontal direction and a vertical direction, a space required for optical wavelength distribution elements or optical wavelength distribution is reduced, and thus an optical module can be miniaturized.

The present invention is not limited to the above-described embodiments and may be variously modified and formed within a range in which the technical spirit of the present invention allows.

What is claimed is:

1. An ultra-small multi-channel optical module with optical wavelength distribution, comprising:
   a plurality of optical elements configured to emit light having different wavelengths;
   parallel light lenses configured to convert the light emitted by the optical elements into parallel light;
   a first rectangular reflector configured to reflect the parallel light, which is converted by the parallel light lenses, in a vertical direction;
   a second rectangular reflector which is disposed above the first rectangular reflector with a gap therebetween, reflects the parallel light, which are reflected by the first rectangular reflector, in a horizontal direction, and reflects parallel light, which are collinearly received, in the vertical direction;
   horizontal reflectors disposed to be collinear with the second rectangular reflector with a gap therebetween and configured to reflect the parallel light, which are reflected by the second rectangular reflector, in the horizontal direction;
   optical filters which are disposed between the first rectangular reflector and the second rectangular reflector, transmit the parallel light which move from the first rectangular reflector toward the second rectangular reflector, and reflect the parallel light, which move from the second rectangular reflector toward the first rectangular reflector, back toward the second rectangular reflector; and
   a light collecting lens configured to receive a plurality of light beams, which are emitted by the optical elements, from the horizontal reflector.

2. The ultra-small multi-channel optical module of claim 1, wherein the first rectangular reflector has a form inclined upward at an angle of 45°.

3. The ultra-small multi-channel optical of claim 1, wherein the second rectangular reflector has a form inclined downward at an angle of 45° so that the parallel light received from thereunder is reflected in the horizontal direction and the parallel light collinearly received is reflected downward in the vertical direction.

4. The ultra-small multi-channel optical module of claim 1, wherein:
   the horizontal reflectors are disposed to face the plurality of optical elements; and
   the number of the horizontal reflectors is the same as that of the optical elements.

5. The ultra-small multi-channel optical module of claim 1, wherein the horizontal reflectors are fixed to face the plurality of optical elements and to be coplanar therewith.

6. The ultra-small multi-channel optical module of claim 1, wherein:
   the parallel light lenses are disposed between the optical elements and the first rectangular reflector and disposed to be collinear therewith and to have a predetermined gap therebetween; and
   the number of the parallel light lenses is the same as that of the optical elements.

7. The ultra-small multi-channel optical module of claim 1, further comprising:
   a base board having a hollow form having a mounting hole passing through the base board;
   a glass substrate disposed on the base board;
   a heat sink seated inside the mounting hole of the base board and disposed under the optical elements, the parallel light lenses, and the first rectangular reflector; and
   a glass cover having a form which covers the glass substrate and on which the second rectangular reflector, the horizontal reflectors, and the light collecting lens are disposed.

8. The ultra-small multi-channel optical module of claim 7, wherein the base board includes an optical element driver connected to the optical elements.

9. The ultra-small multi-channel optical module of claim 7, wherein:
   the base board includes an optical element driver connected to the optical elements; and
   the optical elements and the optical element driver are connected through lead wires.

10. The ultra-small multi-channel optical module of claim 7, wherein the glass substrate includes a through glass via (TGV) therein for electrical connection with an external device.

11. The ultra-small multi-channel optical module of claim 10, wherein:
    wire-bonded lead wires are provided in the TGV; and
    the lead wires are electrically connected to the optical elements.

12. The ultra-small multi-channel optical module of claim 7, wherein:
    a contact surface of the glass cover in contact with the glass substrate is sealed by solder.

13. An ultra-small multi-channel optical module with optical wavelength distribution, comprising:
    a base board having a hollow form having a mounting hole passing through the base board;
    a glass substrate disposed on the base board;
    a heat sink seated inside the mounting hole of the base board;
    a plurality of optical elements disposed on the heat sink and configured to emit light having different wavelengths;
    parallel light lenses disposed on the heat sink and configured to convert the light, which are emitted by the optical elements, into parallel light;
    a first rectangular reflector disposed on the heat sink and configured to reflect the parallel light, which are converted by the parallel light lenses, in a vertical direction;
    a glass cover which covers the glass substrate to have a sealed structure;
    a second rectangular reflector which is disposed on the glass cover with a gap therebetween, reflects the parallel light, which are reflected by the first rectangular reflector, in a horizontal direction, and reflects parallel light, which are collinearly received, in the vertical direction;
    horizontal reflectors fixed on the glass cover, disposed to be collinear with the second rectangular reflector with a gap therebetween, and configured to reflect the parallel light, which are reflected by the second rectangular reflector, in the horizontal direction;
    optical filters which are disposed between the first rectangular reflector and the second rectangular reflector, transmit the parallel light which move from the first rectangular reflector toward the second rectangular reflector, and reflect parallel light, which move from the second rectangular reflector toward the first rectangular reflector, back toward the second rectangular reflector; and a light collecting lens disposed on the glass cover and configured to receive a plurality of light beams, which are emitted by the optical elements, from the horizontal reflector.

14. The ultra-small multi-channel optical module of claim 13, wherein the first rectangular reflector has a form inclined upward at an angle of 45°.

15. The ultra-small multi-channel optical module of claim 13, wherein the second rectangular reflector has a form inclined downward at an angle of 45° so that the parallel light, which are received from thereunder, is reflected in the horizontal direction and the parallel light, which are collinearly received, is reflected downward in the vertical direction.

16. The ultra-small multi-channel optical module of claim 13, wherein:
the horizontal reflectors are disposed to face the plurality of optical elements; and
the number of the horizontal reflectors is the same as that of the optical elements.

17. The ultra-small multi-channel optical module of claim 13, wherein:
the parallel light lenses are disposed between the optical elements and the first rectangular reflector and disposed to be collinear therewith and to have a predetermined gap therebetween; and
the number of the parallel light lenses are the same as that of the optical elements.

18. The ultra-small multi-channel optical module of claim 13, wherein the base board includes an optical element driver connected to the optical elements.

19. The ultra-small multi-channel optical module of claim 13, wherein the glass substrate includes a through glass via (TGV) therein for electrical connection with an external device.

20. The ultra-small multi-channel optical module of claim 13, wherein a contact surface of the glass cover in contact with the glass substrate is sealed by solder.

* * * * *